United States Patent
Ce

(10) Patent No.: US 10,691,289 B2
(45) Date of Patent: Jun. 23, 2020

(54) LONG-RUNNING ACTIONS IN SMART TEMPLATE LIST REPORTS

(71) Applicant: SAP SE, Walldorf (DE)

(72) Inventor: Vighneswaran Ce, Bangalore (IN)

(73) Assignee: SAP SE, Walldorf (DE)

( * ) Notice: Subject to any disclaimer, the term of this patent is extended or adjusted under 35 U.S.C. 154(b) by 16 days.

(21) Appl. No.: 16/166,671

(22) Filed: Oct. 22, 2018

(65) Prior Publication Data

US 2020/0125233 A1 Apr. 23, 2020

(51) Int. Cl.
*G06F 3/0481* (2013.01)
*G06F 3/0484* (2013.01)
*G06F 40/18* (2020.01)
*G06F 40/186* (2020.01)

(52) U.S. Cl.
CPC ...... *G06F 3/04812* (2013.01); *G06F 3/04842* (2013.01); *G06F 40/18* (2020.01); *G06F 40/186* (2020.01)

(58) Field of Classification Search
CPC ............ G06F 3/04812; G06F 3/04842; G06F 17/246; G06F 17/248
See application file for complete search history.

(56) References Cited

U.S. PATENT DOCUMENTS

| | | | | |
|---|---|---|---|---|
| 5,878,426 | A * | 3/1999 | Plasek | G06F 16/2462 |
| 8,086,955 | B2 * | 12/2011 | Zhou | H04L 67/12 715/234 |
| 10,289,672 | B1 * | 5/2019 | Olkin | G06F 17/10 |
| 2012/0089486 | A1 * | 4/2012 | Mahakian | G06Q 30/0635 705/26.81 |
| 2012/0296880 | A1 * | 11/2012 | Chen | G16B 50/00 707/692 |
| 2014/0122998 | A1 * | 5/2014 | Shin | G06F 17/2247 715/234 |
| 2015/0317572 | A1 * | 11/2015 | Balasubramanian | G06Q 10/063 705/7.11 |
| 2016/0291590 | A1 * | 10/2016 | Kuniyasu | G05B 15/02 |
| 2018/0336239 | A1 * | 11/2018 | Yang | G06F 17/246 |

* cited by examiner

*Primary Examiner* — Shourjo Dasgupta
(74) *Attorney, Agent, or Firm* — Buckley, Maschoff & Talwalkar LLC

(57) ABSTRACT

A method of performing list report actions, the method including receiving an indication of a selection of one or more list report cells on a list report user interface, identifying the one or more selected list report cells, providing a cell busy visual indicator for display on the user interface for each selected list report cell, communicating to a backend process identifying information for each selected list report cell, waiting for a response from the backend process, continuing end user access to non-selected cells of the list report user interface during the waiting step, if a response is received from the backend process, then removing the cell busy visual indicator from each selected cell, and updating respective cells with content from the response, and providing end user access to the selected one or more cells after the update. A system and a non-transitory computer-readable medium are also disclosed.

18 Claims, 5 Drawing Sheets

FIG. 3

LONG-RUNNING ACTIONS IN SMART TEMPLATE LIST REPORTS

BACKGROUND

Conventional approaches to changing the value of a particular smart template list report table cell, and in some instances their related data fields, can be implemented using an object processing framework without needing any additional user interface coding. In some instances, the action of changing the particular cell value can result in a long-running action. For example, in the manufacturing sector, a long-running action (e.g., perhaps 2-5 minutes, or more) can occur when a change is made in an element of a bill-of-material (BOM) table due to the high number of individual components, parts, and subassemblies, which can perhaps number in the thousands.

In some applications (i.e., uses) of a smart template list report, a user could be initiating an action to change a value as frequently as every 15 minutes, or less. Conventional processes lock a user from making several selections before implementing the processing framework. During its processing of each single selection, conventional approaches can block a user from accessing other list report elements.

When multiple selections are made, conventional approaches can schedule these selections as a background process. Conventional approaches do not include notification mechanisms from the server to alert to the user that the action/operation is completed. Accordingly, the user needs to repeatedly perform an empirical refresh to observe and confirm changed values. The conventional approach to performing background processes is better suited to fields where cell values change on a daily, or greater, frequency and where the operations can take hours to complete.

Conventional approaches for performing long-running actions in list data reports lock-out a user from accessing fields in the report that are not undergoing action, while the action is ongoing. Conventional approaches are best suited for calculations that complete in under a few (e.g., about 2-5) seconds or less. What is missing from the art is performing long-running actions in list data reports while allowing a user to perform tasks and/or access other data inside the application and provide a notification to the user when the ongoing action is completed.

BRIEF DESCRIPTION OF THE DRAWINGS

FIG. 3 depicts the list report user interface of FIG. 1 including cell busy visual indicators in accordance with embodiments;

DETAILED DESCRIPTION

In accordance with embodiments, systems and methods perform long-running actions on smart template list reports while providing the end user access to other fields of the list report while the long-running action is ongoing. In accordance with embodiments, a notification is provided to the user indicating that the action is completed. Embodying systems and methods provide the user with the capability to initiate other actions in the list report, while an action is ongoing. Accordingly, embodying approaches provide a user with the ability to freely use other elements of the list report after triggering a long-running calculation in one or more elements.

Embodying systems and methods improve user productivity (by allowing access to other elements), and complete task actions more rapidly than conventional approaches. For example, embodiments can reduce completion time from about 2-5 minutes to about 1 minute.

Because a user can continue carrying on other activities within the application after triggering a calculation, productivity is improved. The user can continue to prepare or analyze or perform other actions on various other BOM (components/materials) when calculations are ongoing. Embodying approaches provide the end user to be fully engaged with the complete functional capabilities of the application while the triggered calculation is being performed.

In accordance with embodiments, an asynchronous backend call can be made to perform the user-selected action. During backend execution of the task, a visual indicator can be displayed in the selected cell(s) and field(s). Unlike conventional approaches, embodying systems and methods do not block access to the entire user interface while an action is ongoing. In some implementations, fields with expansive operations are refreshed at a higher rate. In embodiments, object page fields related to the list report field selected by the user can also be updated similarly.

Figure 1:
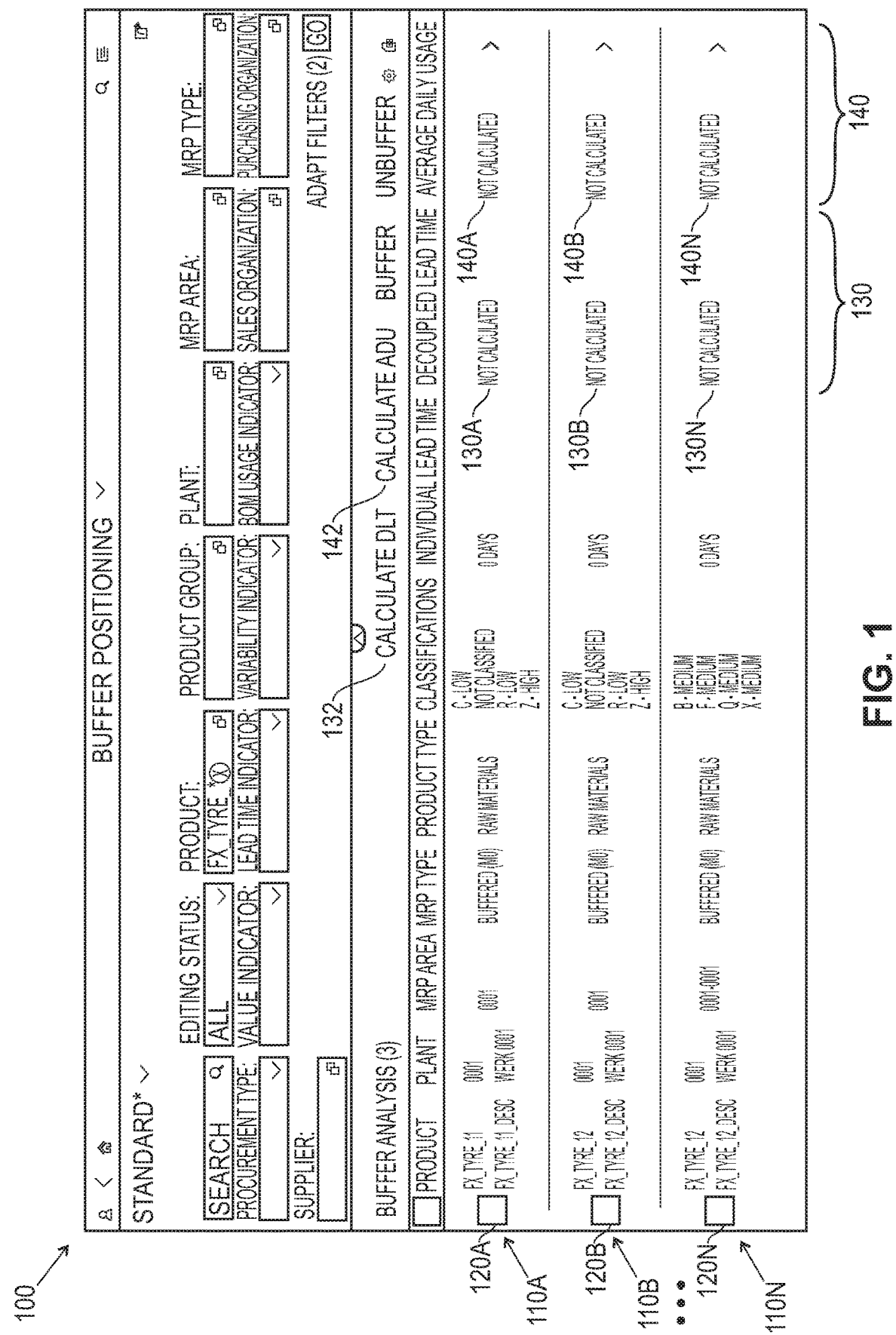
FIG. 1 depicts a list report user interface in accordance with embodiments.

FIG. 1 depicts list report user interface (UI) 100 in accordance with embodiments. The list report UI includes one or more data rows 110A, 110B, . . . , 110N having columnar data. Each data row includes a respective selection box 120A, 120B, . . . , 120N in which a user can indicate that the corresponding row is selected for an action.

As depicted, decoupled lead time (DLT) column 130 includes cells 130A, 130B, . . . , 130N. Average daily usage (ADU) column 140 includes cells 140A, 140B, . . . , 140N. The list report user interface includes calculate DLT button 132 and calculate ADU button 142. A user can initiate an action by activating a corresponding calculate button. For example, cells within both the DLT and ADU columns are not yet calculated. A user can select an individual cell using one or more of selection box 120A, 120B, . . . , 120N and then activating calculate DLT button 132 or calculate ADU button 142. It should be readily understood that embodying systems and methods enable selection from among all the cells in any column—whether the data within a cell already exists, or is yet to be calculated/recalculated.

Figure 2:
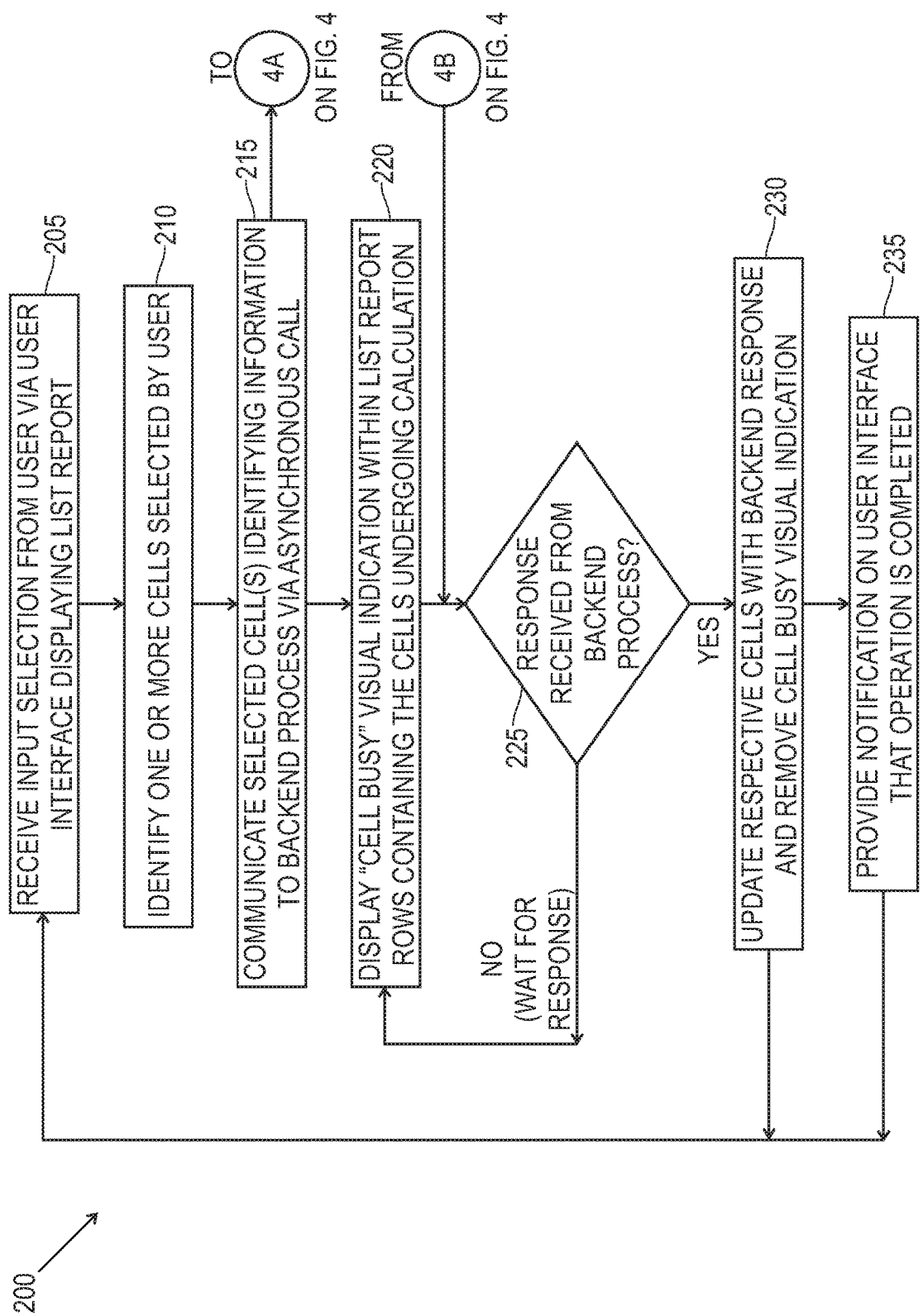
FIG. 2 depicts a process of performing long-running list report actions in accordance with embodiments.
Figure 3:
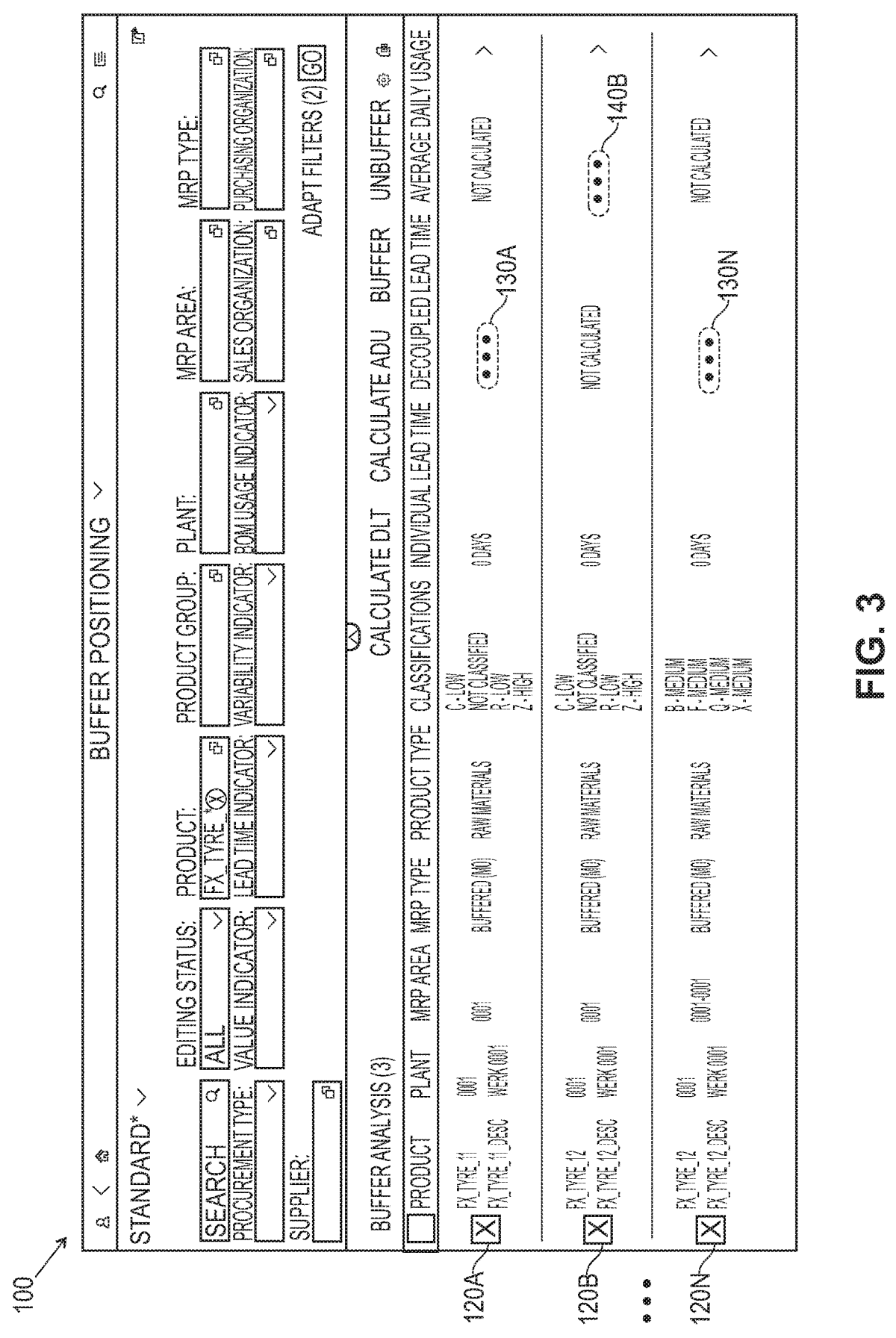

FIG. 2 depicts process 200 to perform long-running actions in accordance with embodiments. Process 200 receives one or more input selections from a user via an interactive list report display interface, step 205. The user selects from among list report cells in any of rows 110A, 110B, . . . , 110N. The user can select zero, one, or more cells within a row. For example, FIG. 3 depicts list report user interface 100 after a user has initiated an embodying method by selecting from among the cells. The mark depicted in selection box 120A, 120B, and 120N (FIG. 3) is an indication that at least one cell is selected in these rows.

After selecting cells, a user can request a list report action (e.g., calculation, sort, etc.) by selecting a button associated with each column having a selected cell. For example, in FIG. 3, the user could select calculate DLT button 132 or calculate ADU button 142 if cells in the corresponding column were selected by the user. Process 200 identifies, step 210, the selected cells by traversing the table to identify a cell at the intersection between a row with a marked selection box and an activated column function (e.g., cells 130A, 140B, and 130N). Identifying information for the selected cells is communicated, step 215, to a backend processing unit via an asynchronous call.

Unlike conventional approaches that would lock-out user access to the list report while a backend process is ongoing, embodying systems and methods provide a cell busy visual indicator in the identified cells selected by the user. FIG. 3 depicts a visual indicator of three circular bullets at the selected cell locations (e.g., cells 130A, 140B, and 130N). Embodying systems and methods are not so limited. Any type of visual indicator, whether static or dynamic, can be displayed in the identified cell (e.g., an hourglass, a clock, shading, progression bar, etc.). During the execution of the backend process, a user can continue accessing non-selected list report cells. During the backend process execution, the user can submit other cell selections and request a different list report action be performed on this selection.

A determination is made, step 225, as to whether a response is yet received from the backend process. If a response is not yet received, process 200 enters a wait state and continues to display the cell busy visual indicator. During this period or time, a user can access other non-selected cells in the list table report in accordance with embodiments.

If at step 225 a determination is made that a response has been received, process 200 then updates the respective cells with the response from the backend process, step 230, and removes the busy cell visual indicator from the cell. In accordance with embodiments, a notification can be displayed, step 235, to the application user indicating that the operations have successfully completed, and the cells are updated with the latest calculated values. In some implementations, this notification can be a short-duration, popup message—e.g., a toast message or the like.

Figure 4:
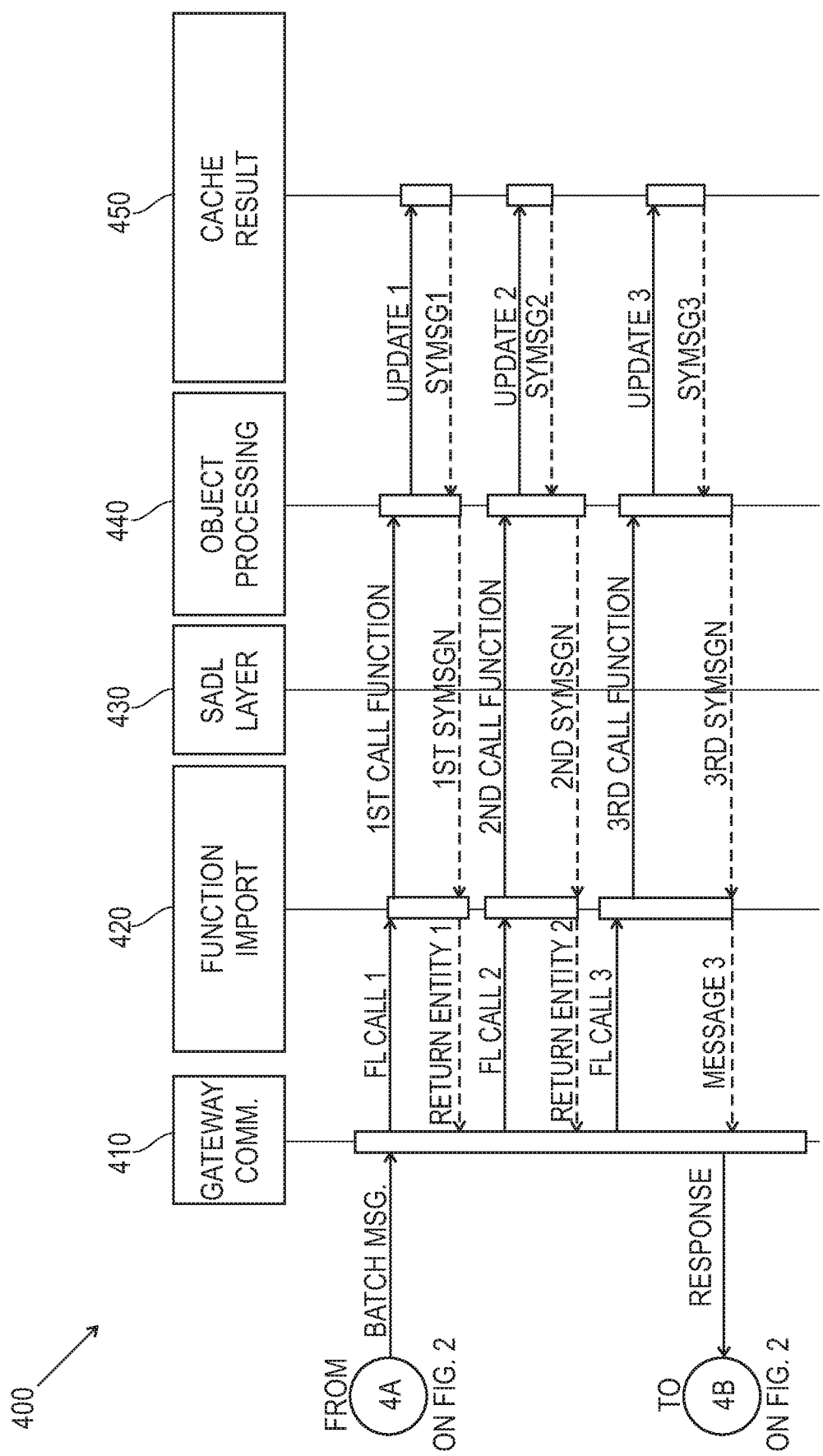
FIG. 4 depicts a backend process for the process of FIG. 2 in accordance with embodiments.
Figure 5:
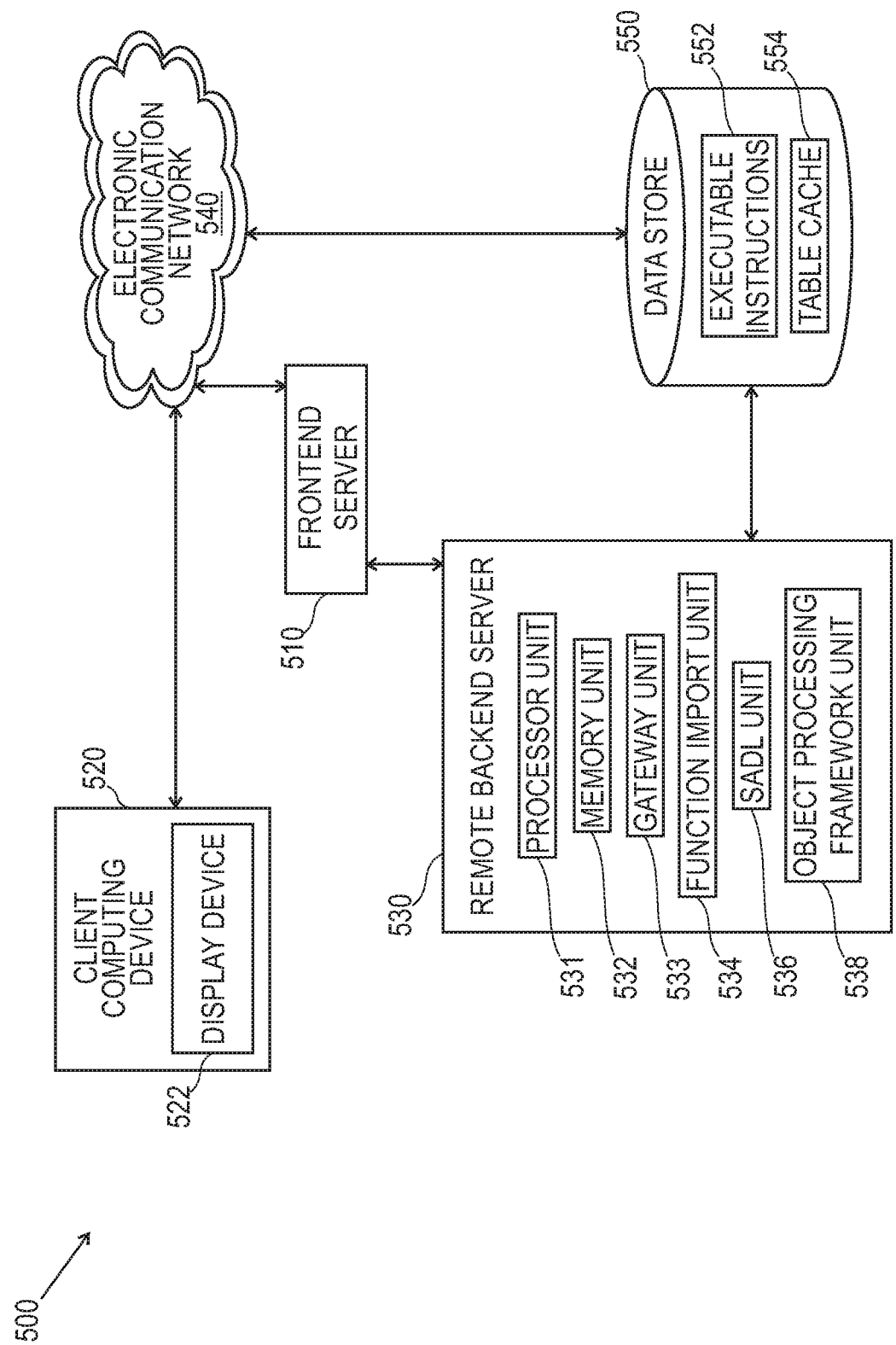
FIG. 5 depicts a system for implementing long-running list report actions in accordance with embodiments.

FIG. 4 depicts backend process 400 that is called by process 200 in accordance with embodiments. FIG. 5 depicts system 500 for implementing a long-running list report action(s) in accordance with embodiments.

Backend process 400 can receive, step 410, a batch message containing the cell-identifying information. In the depicted example, batch message contains identifying information for three cells. Frontend server 510 can route communication between client computing device 520 and remote backend server 530 through electronic communication network 540. Client computing device 520 can include a display device 522 for the presentation of list report user interface 100. In some implementations there can be multiple client computing devices in communication across the electronic communication network with frontend server 510. Additionally, there can be multiple frontend servers that are each in communication with multiple client computing devices.

The batch message is split, step 410, into multiple function import (FI) calls by a gateway comm process. The gateway comm process separates the batch messages into distinct function calls. If three cells in one column are selected, the single batch call is split in three calls; if N cells are selected in a column, N FI calls are created. For each FI call the function import unit 534 invokes object processing framework unit 538 bypassing Service Adaptation Definition Language (SADL) unit 536. The object processing framework unit 538 acts on these individual function call invocations by performing the required time-consuming calculations for the identified cells. After calculating the cell data for a row, the calculated information is stored, step 450, in a cache table 554 located in data store 550. For each identified cell belonging to a row, a response to the function call is sent via messaging to gateway unit 533, which forwards the response (updated cell information) to the client computing device through a frontend server.

Remote backend server 530 can include gateway unit 533 in communication with front end server 510. Processor unit 531 is in communication with data store 540. The control processor can be in direct communication with the data store, or in indirect communication across the electronic communication network. Processor unit 531 can execute executable instructions 552, which cause the processor to perform process 200 for long-running list report actions. Memory unit 532 can provide the control processor with local cache memory.

Embodying systems and methods provide an end user a visual indication that background, field-level calculations are occurring on list report cells selected by the user. In accordance with embodiments, remaining cells in the list report are available to the user for operations. In accordance with embodiments, a pop-up toast message can be presented to the end user on display 522, to seamlessly notify the end user when the operation/action is completed. In accordance with embodiments, while the background operations are being performed in response to an asynchronous call to the backend process, an end user can access any part of the application.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable program instructions that when executed may instruct and/or cause a controller or processor to perform methods discussed herein such as a method for implementing long-running list report actions, as disclosed above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method of performing list report actions, the method comprising:

receiving an indication of a selection of one or more list report cells on an interactive list report user interface, the list report user interface including one or more user-activatable action buttons, each user-activatable action button performing a calculation incorporating data within one or more of the selected list report cells;

identifying the one or more selected list report cells;

providing a cell busy visual indicator for display on the list report user interface for each selected list report cell;

communicating, to a backend process, identifying information for each selected list report cell;

waiting for a response from the backend process, the response including a calculation result, the calculation initiated by a user's activation of at least one user-activatable button of the list report user interface;

continuing end user access to non-selected cells of the list report user interface during the waiting step;

if a response is received from the backend process, then removing the cell busy visual indicator from each selected cell, and updating respective cells with content from the response; and providing end user access to the selected one or more cells after the update.

2. The method of claim 1, including prior to identifying the one or more selected list report cells receiving a request to perform a list report action.

3. The method of claim 1, identifying the one or more selected list report cells including traversing cells in a column for a requested list report action and determining the contents of a row selection box for each cell in the column.

4. The method of claim 1, including:

accepting a second selection of one or more cells in the list report; and receiving a second list report action request.

5. The method of claim 1, including the backend process performing a requested list report action on each selected cell.

6. The method of claim 1, including after the update, displaying on the list report user interface a notification message that end user access is available.

7. A non-transitory computer-readable medium having stored thereon instructions which when executed by a control processor cause the control processor to perform a method of performing list report actions, the method comprising:

receiving an indication of a selection of one or more list report cells on a n interactive list report user interface, the list report user interface including one or more user-activatable action buttons, each user-activatable action button performing a calculation incorporating data within one or more of the selected list report cells;

identifying the one or more selected list report cells;

providing a cell busy visual indicator for display on the list report user interface for each selected list report cell;

communicating, to a backend process, identifying information for each selected list report cell;

waiting for a response from the backend process, the response including a calculation result, the calculation initiated by a user's activation of at least one user-activatable button of the list report user interface;

continuing end user access to non-selected cells of the list report user interface during the waiting step;

if a response is received from the backend process, then removing the cell busy visual indicator from each selected cell, and updating respective cells with content from the response; and providing end user access to the selected one or more cells after the update.

8. The non-transitory computer-readable medium of claim 7, the instructions further configured to cause the control processor to perform the method, including prior to identifying the one or more selected list report cells receiving a request to perform a list report action.

9. The non-transitory computer-readable medium of claim 7, the instructions further configured to cause the control processor to perform identifying the one or more selected list report cells by traversing cells in a column for a requested list report action and determining the contents of a row selection box for each cell in the column.

10. The non-transitory computer-readable medium of claim 7, the instructions further configured to cause the control processor to perform the method, including:

accepting a second selection of one or more cells in the list report; and receiving a second list report action request.

11. The non-transitory computer-readable medium of claim 7, the instructions further configured to cause the control processor to perform the method, including the backend process performing a requested list report action on each selected cell.

12. The non-transitory computer-readable medium of claim 7, the instructions further configured to cause the control processor to perform the method, including after the update, displaying on the list report user interface a notification message that end user access is available.

13. A system for performing list report actions, the system comprising:

a server including a processor unit, the server in communication with a data store;

a frontend server unit in communication with the server across an electronic communication network;

a client computing device including a display, the display configured to present a n interactive list report user interface, the client in communication with the frontend server unit;

the data store including executable instructions which when executed by the control processor cause the control processor to perform a method comprising:

receiving an indication of a selection of one or more list report cells on the list report user interface, the list report user interface including one or more user-activatable action buttons, each user-activatable action button performing a calculation incorporating data within one or more of the selected list report cells;

identifying the one or more selected list report cells;

providing a cell busy visual indicator for display on the list report user interface for each selected list report cell;

communicating, to a backend process, identifying information for each selected list report cell;

waiting for a response from the backend process, the response including a calculation result, the calculation initiated by a user's activation of at least one user-activatable button of the list report user interface;

continuing end user access to non-selected cells of the list report user interface during the waiting step;

if a response is received from the backend process, then removing the cell busy visual indicator from each selected cell, and updating respective cells with content from the response; and providing end user access to the selected one or more cells after the update.

14. The system of claim 13, the instructions further configured to cause the control processor to perform the method, including prior to identifying the one or more selected list report cells receiving a request to perform a list report action.

15. The system of claim 13, the instructions further configured to cause the control processor to perform identifying the one or more selected list report cells by traversing cells in a column for a requested list report action and determining the contents of a row selection box for each cell in the column.

16. The system of claim 13, the instructions further configured to cause the control processor to perform the method, including:
   accepting a second selection of one or more cells in the list report; and
   receiving a second list report action request.

17. The system of claim 13, the instructions further configured to cause the control processor to perform the method, including the backend process performing a requested list report action on each selected cell.

18. The system of claim 13, the instructions further configured to cause the control processor to perform the method, including after the update, displaying on the list report user interface a notification message that end user access is available.

* * * * *